United States Patent
Caspar et al.

(10) Patent No.: US 8,261,962 B2
(45) Date of Patent: Sep. 11, 2012

(54) METHOD FOR BRAZING A METALLIC HONEYCOMB BODY FOR EXHAUST GAS TREATMENT AND APPARATUS FOR CARRYING OUT THE METHOD

(75) Inventors: Hans-Peter Caspar, Troisdorf (DE); Hubertus Kotthoff, Ruppichteroth (DE); Jörg Gutowski, Eisenach (DE); Dietmar Chauchet, Köln (DE); Ludwig Wieres, Overath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/050,095

(22) Filed: Mar. 17, 2011

(65) Prior Publication Data

US 2011/0210158 A1     Sep. 1, 2011

Related U.S. Application Data

(63) Continuation of application No. PCT/EP2009/060934, filed on Aug. 25, 2009.

(30) Foreign Application Priority Data

Sep. 17, 2008   (DE) .......................... 10 2008 047 498

(51) Int. Cl.
   *B23K 31/02*   (2006.01)
(52) U.S. Cl. ...... 228/181; 228/183; 228/219; 228/233.2
(58) Field of Classification Search ........................ None
   See application file for complete search history.

(56) References Cited

U.S. PATENT DOCUMENTS

| | | | | |
|---|---|---|---|---|
| 2,891,848 A | * | 6/1959 | Jaffe | 75/401 |
| 3,852,873 A | * | 12/1974 | Chartet | 228/207 |
| 3,982,887 A | | 9/1976 | Kendziora et al. | |
| 4,839,141 A | * | 6/1989 | Mizuhara | 420/587 |
| 4,900,638 A | * | 2/1990 | Emmerich | 428/606 |
| 4,903,890 A | * | 2/1990 | Mizuhara | 228/262.31 |
| 4,911,351 A | * | 3/1990 | Ishikawa et al. | 228/183 |
| 5,016,809 A | | 5/1991 | Winterbottom et al. | |
| 5,172,847 A | * | 12/1992 | Barten et al. | 228/18 |
| 5,195,673 A | * | 3/1993 | Irish et al. | 228/18 |
| 5,286,314 A | * | 2/1994 | Das et al. | 148/528 |

(Continued)

FOREIGN PATENT DOCUMENTS

DE        2254769 A1    5/1974

(Continued)

OTHER PUBLICATIONS

International Search Report of PCT/EP2009/060934, Dated Nov. 30, 2009.

*Primary Examiner* — Kiley Stoner
(74) *Attorney, Agent, or Firm* — Laurence A. Greenberg; Werner H. Stemer; Ralph E. Locher

(57) ABSTRACT

A method for brazing a metallic honeycomb body (1) for exhaust gas treatment, includes at least:
a) pretreatment of a honeycomb body (1) at a temperature above 400° C.;
b) cooling the honeycomb body (1);
c) brazing the honeycomb body (1) at a temperature in a range of from 1050° C. to 1100° C. under atmospheric pressure; and
d) cooling the honeycomb body (1). A suitable apparatus for carrying out the method is also provided.

20 Claims, 2 Drawing Sheets

U.S. PATENT DOCUMENTS

| | | | |
|---|---|---|---|
| 5,305,945 A * | 4/1994 | Cottone et al. | 228/183 |
| 5,322,209 A * | 6/1994 | Barten et al. | 228/183 |
| 5,375,760 A * | 12/1994 | Doko | 228/183 |
| 5,618,498 A | 4/1997 | Konya et al. | 422/174 |
| 5,648,176 A | 7/1997 | Nakagawa et al. | 428/593 |
| 5,657,923 A * | 8/1997 | Sheller | 228/181 |
| 5,782,402 A | 7/1998 | Wieres | |
| 6,200,690 B1 * | 3/2001 | Rabinkin | 428/606 |
| 6,240,640 B1 * | 6/2001 | Matsuoka et al. | 29/897.32 |
| 6,257,483 B1 * | 7/2001 | Inaba | 228/262.42 |
| 6,264,092 B1 * | 7/2001 | Yasuda et al. | 228/161 |
| 6,617,045 B2 * | 9/2003 | Okazaki et al. | 428/593 |
| 6,689,328 B1 * | 2/2004 | Otani et al. | 422/180 |
| 6,740,178 B2 | 5/2004 | Kurth et al. | |
| 6,749,104 B2 * | 6/2004 | Rabinkin | 228/183 |
| 6,852,428 B2 * | 2/2005 | Hirota et al. | 428/680 |
| 7,131,198 B2 | 11/2006 | Brück et al. | |
| 7,442,445 B2 * | 10/2008 | Sagawa et al. | 428/679 |
| 7,886,810 B2 * | 2/2011 | Angermann | 165/158 |
| 2001/0030184 A1 * | 10/2001 | Richert et al. | 219/388 |
| 2003/0033715 A1 * | 2/2003 | Iriyama et al. | 29/890.054 |
| 2005/0067467 A1 * | 3/2005 | Abell et al. | 228/183 |
| 2006/0105193 A1 * | 5/2006 | Burger et al. | 428/654 |
| 2006/0166028 A1 * | 7/2006 | Sagawa et al. | 428/619 |
| 2007/0040004 A1 * | 2/2007 | Althofer | 228/101 |
| 2007/0284417 A1 * | 12/2007 | Yamada | 228/101 |
| 2009/0134142 A1 * | 5/2009 | Nakamura et al. | 219/420 |
| 2009/0148357 A1 * | 6/2009 | Kaneeda et al. | 422/180 |

FOREIGN PATENT DOCUMENTS

| | | |
|---|---|---|
| DE | 3726075 C1 | 3/1989 |
| DE | 69012722 T2 | 1/1995 |
| DE | 199 43 878 A1 | 3/2001 |
| EP | 1867389 A * | 12/2007 |
| JP | 57-098798 A * | 6/1982 |
| JP | 05-185206 A * | 7/1993 |
| JP | 05-185213 A * | 7/1993 |
| JP | 2005-254320 A * | 9/2005 |
| WO | 9608336 A1 | 3/1996 |
| WO | 02/081137 A2 | 10/2002 |
| WO | WO 2006/043137 A * | 4/2006 |

* cited by examiner

FIG. 1
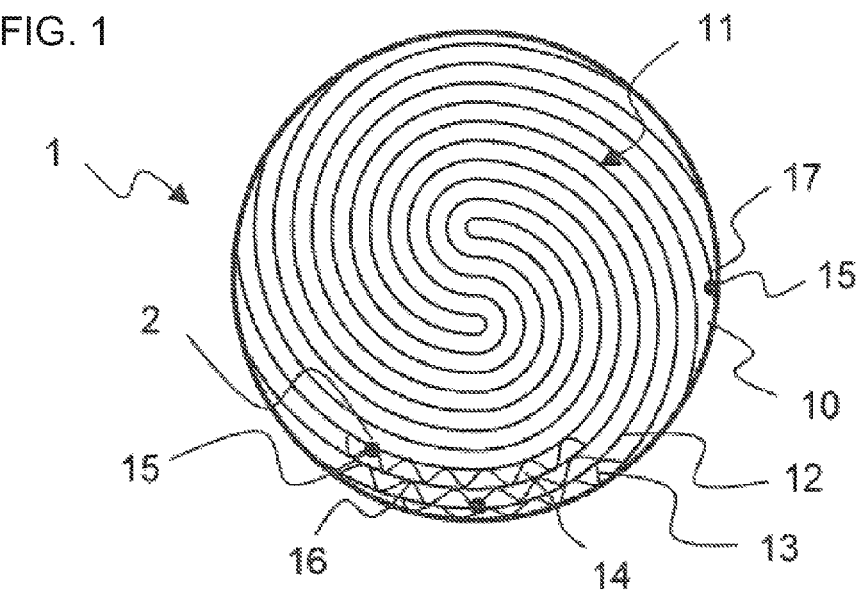
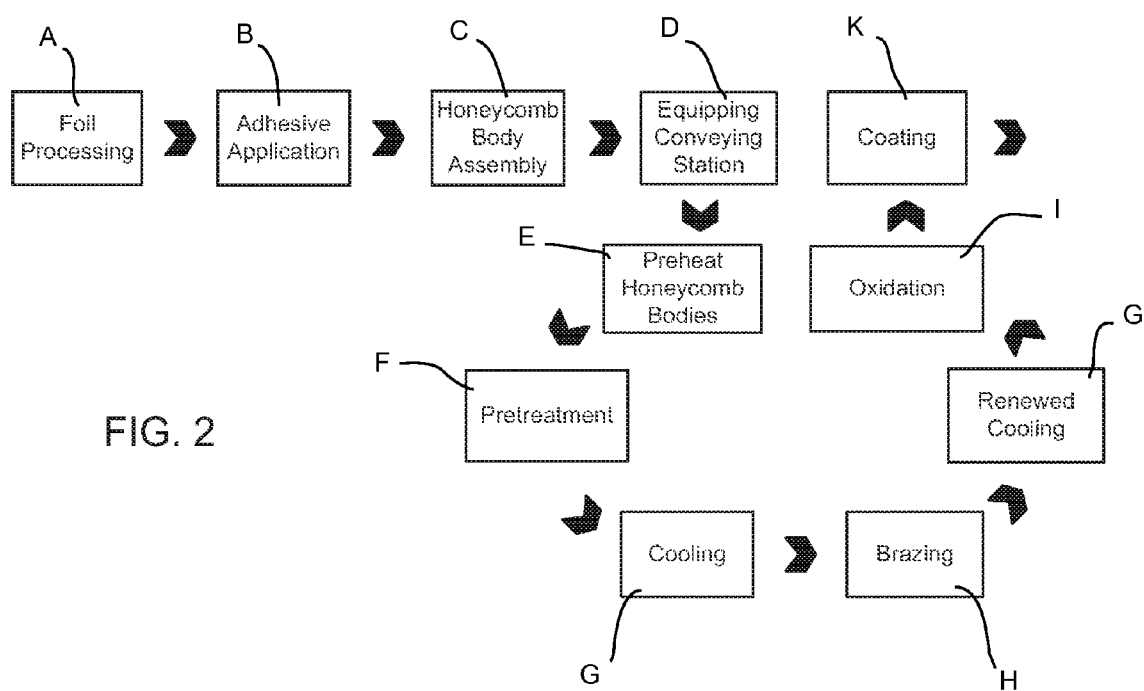
FIG. 2

METHOD FOR BRAZING A METALLIC HONEYCOMB BODY FOR EXHAUST GAS TREATMENT AND APPARATUS FOR CARRYING OUT THE METHOD

CROSS-REFERENCE TO RELATED APPLICATION

This is a continuation, under 35 U.S.C. §120, of copending International Application No. PCT/EP2009/060934, filed Aug. 25, 2009, which designated the United States; this application also claims the priority, under 35 U.S.C. §119, of German Patent Application DE 10 2008 047 498.3, filed Sep. 17, 2008; the prior applications are herewith incorporated by reference in their entirety.

BACKGROUND OF THE INVENTION

Field of the Invention

The present invention relates to methods for brazing a metallic honeycomb body for exhaust gas treatment, in particular for the treatment of mobile combustion gases from an engine, such as, for example, a gasoline engine and/or a diesel engine. The invention also relates to an apparatus for carrying out the method.

In addition to ceramic honeycomb bodies as carrier structures, for example for catalytically active substances, there are also at the present time a multiplicity of metallic honeycomb bodies which are constructed with metallic materials. That, in particular, concerns honeycomb bodies which are assembled together with a plurality of parts to form a honeycomb body. Metallic plates, metallic sheets, metallic foils and the like are employed in that case, for example. In that case, the foils (used herein as a general term for all of the above-mentioned carrier materials) at least form structures and are disposed with respect to one another in such a way that they form channels. Thus, for example, it is known to wind corrugated and/or smooth foils spirally with one another and/or to stack them and/or to bend them together and insert them into a housing. The housing likewise is formed predominantly of metal.

In the production of such metallic honeycomb bodies, it is important that they ultimately withstand the high thermal and/or dynamic loads in the exhaust system of mobile internal combustion engines. In that context, on one hand, alternating thermal stress must be mentioned (from ambient temperature up to, for example, 800 or even 900° C.), as well as excitation to dynamic oscillation, for example due to vehicle vibration, but also as a result of pressure waves appearing in the exhaust system itself caused by the combustion processes. Moreover, it should also be pointed out that such honeycomb bodies are regularly exposed to a highly corrosive environment. Under all of those conditions, the connection of the foils to one another and to the housing should be made permanent and stable. The result of parts of the films coming loose is, in particular, that they put downstream components of the exhaust system at risk and/or block flow paths from the exhaust gas.

Furthermore, it is known to carry out a selective brazing of such honeycomb bodies. That is to say, for example, that it is not desirable to braze all of the contact regions of the foils to one another or to the casing tube. Instead, for example, it is preferable to provide the brazed joint between the foils and the housing in continuous strips. Also with regard to the brazed joints of the foils to one another, where appropriate, axial partial-regions of the overall honeycomb structure are brazed, and others are not. Sometimes, also, as seen in the cross section of the honeycomb structure, portions of the contact points between the foils may be brazed, and others not. What is to be achieved by that directed predetermined brazing is that the thermal stresses occurring inside the honeycomb body are compensated due to the provision of directed deformation regions in which the components of the honeycomb body are relatively moveable with respect to one another.

In order to ensure a metallic honeycomb body having an appropriately long service life, brazing methods have been proposed which have been carried out particularly at very high temperatures and under a vacuum. Exact process management therefore always has to be maintained, and a high outlay in terms of apparatus is required. As an example of a method for producing such a metallic honeycomb body, reference may be made to International Publication No. WO 96/08336 A1, corresponding to U.S. Pat. No. 5,782,402. It is explained therein, in particular, that a vacuum and temperatures of up to and above 1200° C. must be implemented.

SUMMARY OF THE INVENTION

It is accordingly an object of the invention to provide a method for brazing a metallic honeycomb body for exhaust gas treatment and an apparatus for carrying out the method, which overcome the hereinafore-mentioned disadvantages and at least partially solve the highlighted problems of the heretofore-known methods and apparatuses of this general type. In particular, a method for brazing a metallic honeycomb body for exhaust gas treatment is proposed, which can be carried out simply, particularly within the framework of a continuous-flow method. Moreover, honeycomb bodies with directed brazed joints and, where appropriate, permanent corrosion protection, should consequently be capable of being produced. Furthermore, an apparatus for carrying out the method is also to be specified.

With the foregoing and other objects in view there is provided, in accordance with the invention, a method for brazing a metallic honeycomb body for exhaust gas treatment. The method comprises at least the following steps:
 a) pretreating a honeycomb body at a temperature above 400° C.;
 b) cooling the honeycomb body;
 c) brazing the honeycomb body at a temperature in a range of from 1050° C. to 1100° C. under atmospheric pressure; and
 d) cooling the honeycomb body.

At this juncture it may be pointed out, in the first place, that through the use of the method, in particular those types of metallic honeycomb bodies which are described in the introduction can be connected permanently. In this context, "soldering" is always brazing or hard-soldering, as it is known.

Step a) may, in particular, also include a plurality of processes. In general, step a) may be considered to be a cleaning step. In this case, for example, it is possible to preheat the honeycomb body first in air and at atmospheric pressure to a temperature of between 70 and 100° C. in order, in particular, to evaporate water contained in the honeycomb body. Furthermore, a process is carried out in which the honeycomb body is heated further to a temperature of at least 400° C., for example up to approximately 500° C. or 550° C. In this process step, for example, oils, greases or similar constituents are also expelled from the honeycomb body, in addition to water. For this purpose it may be conducive to implement a slight under pressure, so that the treatment of the honeycomb body takes place at a temperature of above 400° C., for example at a pressure of 400 to 800 mbar. Step a) or the temperature treatment above 400° C. should be maintained for a duration of at least 60 min, where appropriate even at least 80 min while, for energy reasons, this treatment should be limited to a maximum of 2 hours.

A cooling of the honeycomb body should thereafter be initiated again (step b)). It is then preferable that the honeycomb body is not cooled to ambient temperature, but is maintained at an increased temperature. The cooling process itself may be carried out through the use of a suitable cooling medium, for example cool air. It is preferable that, in step b), the honeycomb body is cooled to a temperature of between 50 and 250° C. and held there. This step, too, should preferably be maintained for at least one hour.

Thereafter, the metallic honeycomb bodies are prepared in such a way that the actual brazing step can be carried out on them (step c)). In this case, the honeycomb body with the brazing material contained in it is heated for a relatively long period of time to a temperature in the range of 1050° C. to 1100° C. In this case, approximately or substantially atmospheric pressure (approximately 1000 mbar) prevails. In the temperature range specified herein, the brazing material is melted and is distributed (where appropriate also due to a capillary action) in the desired predetermined regions of the metallic honeycomb body and accordingly wets the desired brazing regions to be connected.

After that, the honeycomb body is cooled once more. In this case, it is preferable that the cooling rate of the honeycomb body is similar to the heating rate within the framework of step c). Thus, in step d), the cooling of the honeycomb body is achieved, for example, in a time span of at least 60 min. For cooling, once again, suitable fluids and/or heat exchangers may be provided which are in contact with the process surroundings of the honeycomb body itself during the process. It is precisely when there is contact of the fluid with the honeycomb body that the fluids preferably being used are gaseous fluids (gases).

In the methods illustrated herein, a particular achievement to be emphasized is that the brazing process (step c)) manages without a vacuum, with the result that the handling and the outlay in terms of apparatus for the production of such metallic honeycomb bodies are markedly reduced. This is relevant particularly because such metallic honeycomb bodies are produced in series, and therefore avoiding the vacuum in this process step leads to a marked simplification and cost-effective production of the honeycomb bodies. Moreover, (fully) automatic loading and unloading of the equipment thereby also become possible.

In accordance with another mode of the method of the invention, permanent process gas scavenging is carried out at least during steps a) and c). If appropriate, it is also considered advantageous that permanent process gas scavenging is carried out during steps b) and/or d). What is meant by "process gas scavenging" is that the process gas surrounding the honeycomb bodies is supplied to the treatment space and is extracted therefrom again, so that a permanent exchange of the process gas takes place. In this case, a particularly high purity of the process gas in the surroundings of the metallic honeycomb bodies can be maintained. What is also achieved as a result of the permanent supply and/or discharge of the process gas is that the substances, vapors, particles and the like emerging from the metallic honeycomb body are removed. What may be considered as process gas are, in particular, one or more of the following gasses: air, argon or hydrogen. The cooling of the honeycomb bodies in steps b) and d) preferably takes place through the use of air as the process gas (if appropriate also for oxidation and preferably where appropriate only from temperatures of at most 200° C. or even only a maximum of 150° C.). While the honeycomb body is being held at an increased temperature in step b) and/or in the brazing step c), argon is preferably used (predominantly) as the process gas.

In accordance with a further mode of the invention, a temperature increase takes place predominantly during step c). This is intended, in particular, to reflect the fact that an abrupt heating of the metallic honeycomb bodies during the brazing process is undesirable. Instead, the temperature-increasing process should last for a longer time than the process of holding the honeycomb body in the specified temperature range of 1050° C. to 1100° C. It is preferable that the duration for the temperature increase lasts at least 20%, if appropriate up to 50% or even 100%, longer than the holding of the honeycomb body in the above-mentioned temperature range. In particular, a period of time of 60 to 100 min may be estimated for the temperature increase.

In accordance with an added mode of the invention, a purity of the process gas of at least 99.999% is implemented during step c). In this case, in particular, argon is used as the protective gas, while, if appropriate, fractions of hydrogen may also be supplied. In this case, most preferably, a gas purity of at least 6.0 is implemented. Both process gases are in this case supplied at about atmospheric pressure (approximately 1000 mbar) and exchanged continuously. Preferably, if argon and hydrogen are employed simultaneously, the hydrogen fraction lies markedly below 10% by volume.

In accordance with an additional mode of the invention, the honeycomb body should be formed by an iron material which has chrome and aluminum as main alloying elements, with the chrome fraction being greater than the aluminum fraction by at least the factor 3. In this case, it is most particularly preferred that the chrome fraction lies, for example, in a range of 12 to 25% by weight, while the aluminum fraction lies, for example, in a range of 3 to 6% by weight. Examples of corresponding materials are to be found under number 1.4767 or 1.4725 of the German Steel Code.

In accordance with yet another mode of the invention, a nickel-based brazing material is used for this method, with chrome, phosphorous and silicon being present as main additives. It is most particularly preferred that the fractions of the main additives decrease in the following order: chrome, phosphorus, silicon. It is preferable that the chrome content of the nickel-based brazing material lies above the chrome fraction of the material of the honeycomb body, for example in the range of 23 to 25% by weight. The main additives, phosphorus and silicon, should together not exceed the fraction of chrome. Corresponding nickel-based brazing materials are obtainable, for example, under the designation Nicrobraz from the company Wall Colmonoy Ltd.

In accordance with yet a further mode of the invention, as a result of the development of the method, the honeycomb body is oxidized after step c) in a step e). That is to say particularly, in other words, that the honeycomb body is exposed (again) to an oxidative environment, that is to say, for example, to temperatures of above 600° C., for example about 800° C. In this case, air and/or oxygen are/is supplied as process gas. This step e) may again be maintained, for example, for 20 to 60 min. During this step e), the surfaces of the honeycomb body are provided with an oxide layer, in particular aluminum oxide. This oxide layer serves, in particular, as corrosion protection and for the prevention of diffusion bonds of the film contact points which are not brazed to one another and bear one against the other.

Step e) may directly follow step c) and/or it is also possible that a significant cooling of the honeycomb bodies or of the surroundings is first carried out. Accordingly, in particular, one common furnace for carrying out steps c) and e) may also be provided, with the different ambient conditions (oxygen/protective gas) being separated from one another by appropriate separation devices (slides, intermediate walls, etc.). Thus, step e) may, for example, also be carried out at temperatures just below the melting temperature of the brazing material (for example, 50° C. or lower), so that steps e) and c) can be carried out in direct spatial proximity.

In accordance with yet an added mode of the invention, during step c), a monitoring of the oxygen content takes place. For this purpose, at the inlet into the treatment chamber or at the start of the method step and/or at the outlet of the treatment chamber or at the end of the method, corresponding sensors may be provided which detect the quantity or quality of the process gas, particularly with regard to the oxygen that is present. In this case, in particular, lambda probes, as they are known, are employed.

In accordance with yet an additional mode of the invention, in order to ensure a particularly good series compatibility of the method, the principle of the continuous-flow process is implemented in the method. In this case, the honeycomb bodies are disposed, for example, in specific holding systems and are led along an interconnected, if appropriate closed, conveying section through the individual treatment steps at a uniform predetermined clock frequency.

With the objects of the invention in view, there is concomitantly provided an apparatus for carrying out a method according to the invention for brazing a metallic honeycomb body for exhaust gas treatment in a continuous-flow process. The apparatus comprises a first furnace for carrying out step a), a second furnace for carrying out step c), and a conveying system extending through the first and second furnaces. The conveying system has a clocking drive and slides subdividing the conveying system into surrounding zones.

The conveying system is preferably a circular conveyor, through the use of which a multiplicity of honeycomb bodies can be conveyed and treated simultaneously. In this case, the conveying system, if appropriate, is encapsulated (in portions), while, in the conveying direction, slides, which separate the honeycomb bodies from one another during a stroke of the conveying system, delimit concrete surrounding zones, for example in terms of the temperature and/or the process gas located between them. In the event of transport, the slides are (briefly) opened, and a predetermined number of honeycomb bodies are introduced into and discharged from the respective surrounding zone.

Other features which are considered as characteristic for the invention are set forth in the appended claims, noting that the features listed individually in the claims may be combined with one another in any desired technologically expedient way and exhibit further refinements of the invention.

Although the invention is illustrated and described herein as embodied in a method for brazing a metallic honeycomb body for exhaust gas treatment and an apparatus for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, end-elevational view of an exemplary embodiment of a metallic honeycomb body;

FIG. 2 is a flow chart of an embodiment variant of the method according to the invention;

DETAILED DESCRIPTION OF THE INVENTION

Figure 3:
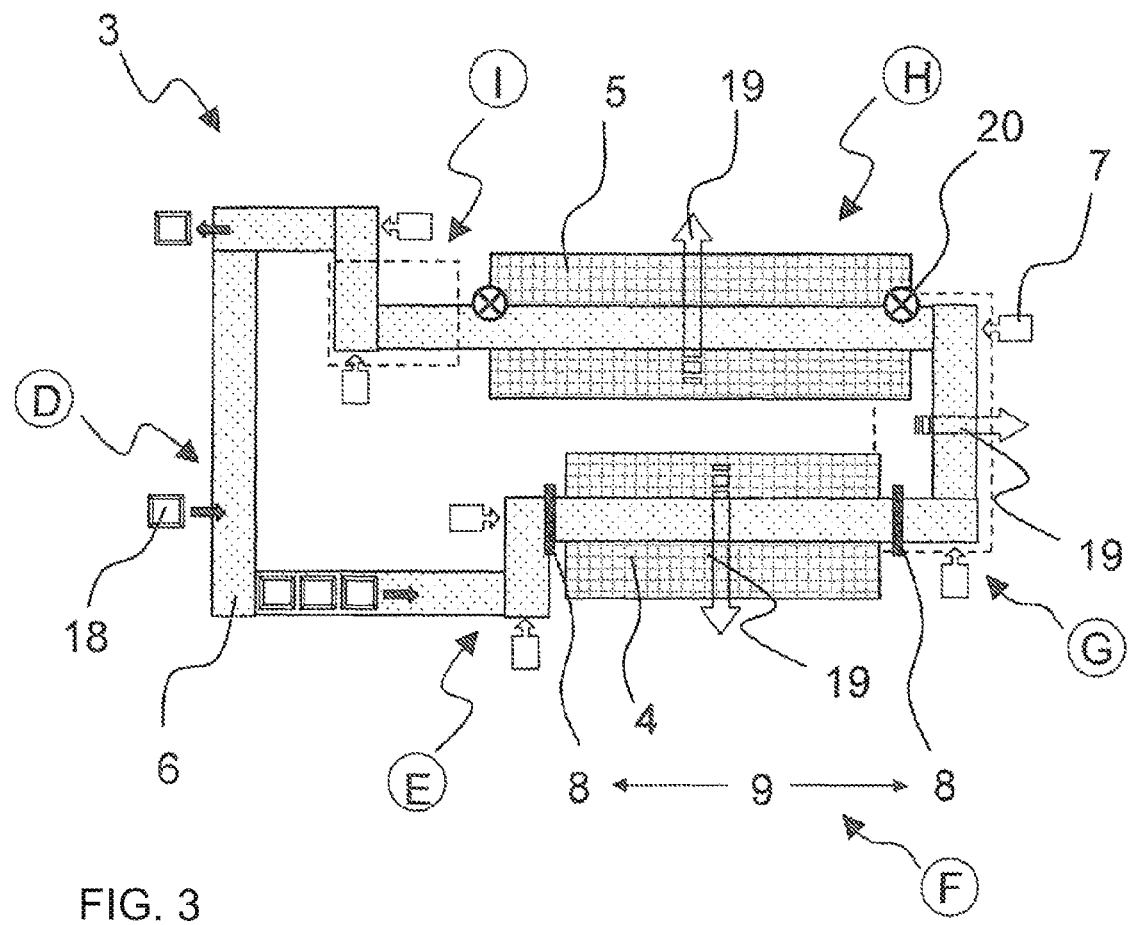
FIG. 3 is a plan view illustrating a layout of a structural variant of an apparatus for carrying out the method.

Referring now in detail to the figures of the drawing for explaining the invention and the technical field in more detail by showing particularly preferred structural variants to which the invention is not restricted, and first, particularly, to FIG. 1 thereof, there is seen a diagrammatically illustrated structural variant of a metallic honeycomb body 1. The honeycomb body 1 in this case has a substantially cylindrical housing 10, although that is not absolutely necessary. A multiplicity of foils which are disposed inside the housing 10 include smooth foils 12 and structured foils 13 having been stacked alternately with one another in this case, subsequently wound in an S-shaped manner and inserted into the housing 10. The S-shaped winding of the foils causes all of these foils to bear with all of their ends 17 against an inner surface of the housing 10. This affords the possibility of fixing each foil securely to the housing, at least at both ends. As a result of the configuration of smooth foils 12 and structured foils 13, contact points 16 are formed, at which the foils bear one against the other. The contact points 16, which are seen herein from an end face 11, extend substantially linearly through the honeycomb body 1, although, if appropriate, only a partial-region of the overall linear contact points 16 is actually constructed to have a brazed joint 15. The number of contact points 16 which are to form a brazed joint 15 may also be relatively small. Thus, for example, the foils may first be provided with an adhesive in concrete, predetermined and locally closely limited portions, so that a nickel-based brazing material 2 adheres only exactly to these predetermined portions and subsequently forms a brazed joint 15. It is preferable, then, for example, for all of the foils to form a brazed joint 15 with the housing 10, at least in a cross section parallel to the end face 11. In this or in another cross section, at most 10% or even at most only 5% of the contact points 16 of the foils with one another are constructed to have a brazed joint 15.

Finally, channels 14 formed by the smooth foil 12 and the structured foil 13 may be provided with a catalytically active substance, so that the honeycomb body can be used, in particular, as a catalyst carrier body for the treatment of exhaust gases which are generated, for example, in an internal combustion engine in motor vehicle construction.

FIG. 2 is intended to diagrammatically illustrate a possible production process for such honeycomb bodies. In this context, for example, foil processing (A) first takes place. During foil processing, in particular, the structuring of the foil occurs, while, if appropriate, a mechanical and/or chemical treatment of the foils may also be carried out. Thereafter, an application (B) of adhesive to at least one of the foils of the honeycomb body may be carried out. In this case, an adhesive or the like, to which the brazing material being supplied is later to adhere, is applied, in particular, in exactly predetermined positions of the structured foil and/or of the smooth foil. After these preparatory measures, the honeycomb body assembly (C) can commence. For this purpose, a predetermined number of smooth foils and structured foils may be layered and inserted (at least partially) into a housing, and in this case the foils may also be shaped, in particular wound or coiled. In particular, what is achieved after the honeycomb body assembly (C) is that the foils are fixed with respect to one another and with respect to the housing in the desired position (for example by appropriate pretensioning), in such a way that they no longer slip out of place with respect to one another for subsequent treatment. A multiplicity of such honeycomb bodies can then, for example, be positioned. Thus, an equipping (D) of a conveying system for thermal treatment is then made possible, with the honeycomb bodies being protected and conveyed in a stable way, for example on suitable pallets for transport. The method according to the invention may subsequently be carried out. In this case, the plurality of honeycomb bodies are first preheated (E) in a first step. A pretreatment (F) according to step a) then takes place. This is followed by a cooling process (G), as explained in this case by step b) of the method according to the invention. Actual brazing (H) according to step c) is then carried out. After brazing (H), a renewed cooling process (G) takes place, as explained by step d) of the method. In the variant illustrated herein, oxidation (I) is also subsequently carried out, as was explained according to step e) of the method. It may also be pointed out in this case, merely for the sake of completeness, that oxidation (I) may also take place directly after the brazing (H), for example in a furnace subdivided into corresponding chambers. When the honeycomb bodies are then cooled, they may also, if appropriate, be coated (K), with coating (K) usually no longer being carried out in the closed conveying system, but rather externally.

FIG. 3 illustrates a possible layout of an apparatus 3 for carrying out the method having the steps a) to e). It is made clear in the first place, on the left in FIG. 3, that pallets 18 having the honeycomb bodies are loaded (D) onto a conveying system 6. They are then first preheated, with the pallets being moved (E) into a corresponding zone. In order to convey the pallets 18, a plurality of clocking, stroke, timing or cycle drives 7 are used, which push the pallets forwards without major vibration.

After preheating, the pallets 18 are introduced into a first furnace 4 which is separated from the rest of the surroundings by two slides 8, so that a predetermined surrounding zone 9 is implemented. The pretreatment of the honeycomb bodies takes place in this first furnace 4 according to step a) of the method. In this case, in particular, a temperature of over 400° C. is set and permanent process gas scavenging 19 is carried out.

After running through the first furnace 4, the pallets 18 having the honeycomb bodies first reach a cooling region (G), with the honeycomb bodies being held at temperatures of between 50 and 100° C. up to a second furnace 5, for example by a heat maintaining or holding device. Permanent process gas scavenging 19, in particular with argon, is implemented in this case too. Whereas a slight underpressure is set in the first furnace 4 and is limited by the slides 8, atmospheric pressure prevails again in the following region.

Thereafter, the pallets 18 having the honeycomb bodies reach the second furnace 5 in which the actual brazing (H) according to step c) of the method is carried out. Sensors 20 are provided at an inlet and an outlet of the second furnace 5 in order to monitor the purity of the process gases. Moreover, it is also possible to provide a chamber directly at the outlet of the second furnace 5 in which oxidization (I) is already (partially) carried out.

After leaving the second furnace, first cooling and thereafter (alternatively or additionally) oxidation (I) of the honeycomb bodies takes place, before they are ultimately transported again into a portion of the conveying system 6 in which the ready-treated honeycomb bodies can be extracted again.

Figure 4:
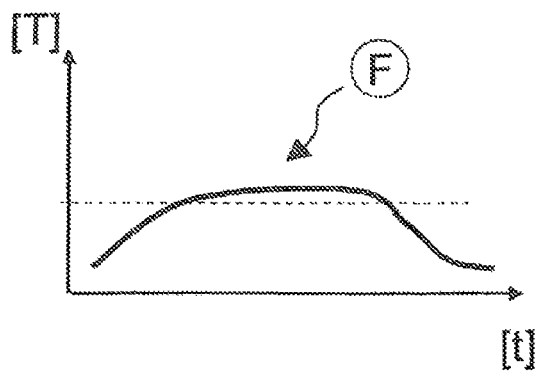
FIG. 4 is a diagram of a first temperature curve.

FIG. 4 diagrammatically illustrates a temperature profile of the honeycomb bodies when they run through the first furnace 4 or when step a) of the method is being carried out. Therefore, temperature [T] is plotted therein against time [t] during pretreatment (F). In this case, the limit temperature, which is given particularly as 400° C., is illustrated by dashes. It can be seen that a temperature above this limit temperature is maintained with respect to the honeycomb bodies for a large part of the duration and pretreatment (F).

Figure 5:
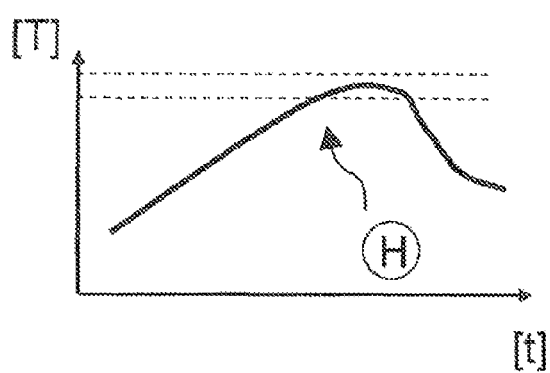
FIG. 5 is a diagram of a second temperature curve.

In contrast, FIG. 5 diagrammatically shows a temperature profile of the honeycomb bodies during brazing (H) according to a variant of step c) of the method. Temperature [T] is once again plotted against time [t], in which case the relationship to FIG. 4 is not true to scale. However, it can be seen in FIG. 5 that a heating process takes place during a long time span of the brazing step (H), and the honeycomb bodies dwell in the given temperature range for only a shortened time span before cooling commences again.

The invention claimed is:

1. A method for brazing a metallic honeycomb body for exhaust gas treatment, the method comprising the following steps carried out in a continuous-flow process:
   a) pretreating a honeycomb body at a temperature above 400° C. in a first furnace to remove water and grease from the honeycomb body in a cleaning step;
   b) cooling the honeycomb body;
   c) brazing the honeycomb body in a second furnace at a temperature in a range of from 1050° C. to 1100° C. under atmospheric pressure;
   d) cooling the honeycomb body; and
   carrying out permanent process gas scavenging at least during steps a) and c).

2. The method according to claim 1, which further comprises carrying out a temperature increase predominantly during step c).

3. The method according to claim 1, wherein the process gas has a purity of at least 99.999% during step c).

4. The method according to claim 1, which further comprises forming the honeycomb body of an iron material having chrome and aluminum as main alloying elements, and a chrome fraction being greater than an aluminum fraction by at least a factor of 3.

5. The method according to claim 1, which further comprises carrying out the brazing step with a nickel-based brazing material having chrome, phosphorus and silicon as main additives.

6. The method according to claim 1, which further comprises oxidizing the honeycomb body after step c) in a step e).

7. The method according to claim 1, which further comprises monitoring an oxygen content during step c).

8. The method according to claim 1, which further comprises forming the honeycomb body with aluminum as an alloying material.

9. The method according to claim 1, which further comprises forming the honeycomb body with aluminum as an alloying element having an aluminum fraction lying in a range of 3 to 6% by weight.

10. The method according to claim 1, which further comprises:
   e) exposing the honeycomb body to an oxidative environment with temperatures above 600 ° C. after step c).

11. The method according to claim 10, which further comprises, during step e), providing surfaces of the honeycomb body with an aluminum oxide layer serving for corrosion protection.

12. The method according to claim 10, which further comprises, during step e), providing surfaces of the honeycomb body with an aluminum oxide layer preventing diffusion bonds at foil contact points not being brazed to one another but bearing one against the other.

13. The method according to claim 10, which further comprises maintaining step e) for 20 to 60 minutes.

14. The method according to claim 10, which further comprises carrying out step e) directly following step c).

15. The method according to claim 10, which further comprises carrying out cooling and then step e) following step c).

16. The method according to claim 10, which further comprises carrying out steps c) and e) in one common furnace having different ambient conditions separated from one another by separation devices.

17. The method according to claim 16, which further comprises selecting the different ambient conditions as a presence of oxygen and a protective gas.

18. The method according to claim 16, which further comprises selecting the separation devices as slides or intermediate walls.

19. The method according to claim 10, which further comprises carrying out step e) at temperatures below a melting temperature of brazing material, permitting steps e) and c) to be carried out in direct spatial proximity.

20. The method according to claim 19, which further comprises carrying out step e) at 50° C. below the melting temperature of the brazing material or lower.

* * * * *